(12) United States Patent
Godina et al.

(10) Patent No.: US 10,788,889 B1
(45) Date of Patent: Sep. 29, 2020

(54) VIRTUAL REALITY LOCOMOTION WITHOUT MOTION CONTROLLERS

(71) Applicant: RAYTHEON COMPANY, Waltham, MA (US)

(72) Inventors: Chad L. Godina, Elkhart, IN (US); Katherine Boyd, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/363,951

(22) Filed: Mar. 25, 2019

(51) Int. Cl.
```
G09G 5/00      (2006.01)
G06F 3/01      (2006.01)
A63F 13/428    (2014.01)
A63F 13/235    (2014.01)
A63F 13/22     (2014.01)
A63F 13/212    (2014.01)
```

(52) U.S. Cl.
CPC .......... *G06F 3/011* (2013.01); *A63F 13/212* (2014.09); *A63F 13/22* (2014.09); *A63F 13/235* (2014.09); *A63F 13/428* (2014.09); *G06F 3/017* (2013.01); *A63F 2300/1012* (2013.01); *A63F 2300/8082* (2013.01)

(58) Field of Classification Search
CPC ............ G06F 3/038; G06F 3/00; G06F 3/048; G09G 5/00
See application file for complete search history.

(56) References Cited

U.S. PATENT DOCUMENTS

| | | | | |
|---|---|---|---|---|
| 2014/0327622 | A1* | 11/2014 | Ouyang | G06F 3/04886 345/169 |
| 2016/0062636 | A1* | 3/2016 | Jung | G06F 3/017 715/762 |
| 2018/0005421 | A1* | 1/2018 | Park | G09G 3/003 |
| 2019/0302895 | A1* | 10/2019 | Jiang | G06F 3/0304 |

* cited by examiner

*Primary Examiner* — Pegeman Karimi
(74) *Attorney, Agent, or Firm* — Lewis Roca Rothgerber Christie LLP

(57) ABSTRACT

A virtual reality (VR) system includes: storage device for storing gesture datasets including key points, and for storing speed groupings data records for each stored gesture dataset; tracking pucks for receiving movement data related to a user's movement in the VR environment; and one or more processors for identifying key points of the user movement within a predetermined time window by analyzing the received movement data, detecting a matched gesture of the user movement by comparing the key points of the user movement and the stored points, selecting a speed group data set for the matched gesture from the stored speed groupings data records to determine movement speed of the user within the VR application, and executing a command in the VR environment based on the verified matched gesture and movement speed of the user.

17 Claims, 5 Drawing Sheets

US 10,788,889 B1

VIRTUAL REALITY LOCOMOTION WITHOUT MOTION CONTROLLERS

FIELD OF THE INVENTION

The disclosed invention relates generally to virtual reality software system and more specifically to a system and method for virtual reality locomotion without using motion controllers.

BACKGROUND

Virtual reality (VR) is an interactive computer-generated experience taking place within a simulated (virtual) environment. A VR system typically incorporates auditory, visual and sensory feedback. Augmented reality systems may also be considered a form of VR that layers virtual information over a live camera feed into a headset or through a portable device giving the user the ability to view three-dimensional images. Current VR systems most commonly uses virtual reality headsets to generate realistic images, sounds and other sensations that simulate a user's physical presence in a virtual environment.

A person using a virtual reality system is able to look around the artificial world, move around in it, and interact with virtual features or items in such environment. The VR headsets typically include a head-mounted display with a small screen in front of the eyes, and transmit vibrations and other sensations to the user through a game controller. The game controller also accepts inputs and instructions from the user, such as moving forward or backward, moving slow or fast, turning, touching, grabbing, controlling an object, and the like, using designated features on the game controller, such as buttons, joystick, icons, etc.

Game controllers provide input to a VR system from a user activating different buttons/dials, by plugging into one of a console's (e.g., a headset) controller ports or wirelessly pairing the game controller with the headset. Examples of game controllers include directional pads, multiple buttons, analog sticks, joysticks, motion detection, touch screens, all of which require activation by a user's hands.

FIG. 1 is a simplified diagram of a typical environment for a virtual reality game. As shown, a user or player interacts with a VR environment, as an accessible use or play world 104 within a physical use/play space 102, using a game controller 106 and a display, headset or VR head mounted display 108. However, virtual reality worlds are inherently restricted to the size of the physical "use space" or "play space" 102. Players/users can walk around within that play space as they do in any other real room. Accessible game worlds 104 that are larger than the physical use space 102 present a problem in regards to how users access distance locations beyond that of the physical use space 102, i.e., a "teleport."

Several solutions have been used in VR applications to address this problem. Common solutions utilize a pair of hand held motion controllers. Teleport is where user points the motion controller to where they would like to be, and when activated the user is instantly relocated to that location. Trackpad/Joystick movement is similar to classic videos games, where the user pushes forward on a hand held motion controller joystick (or trackpad) to begin sliding forward in the VR environment. While some software solutions have been put into place, trackpad locomotion still causes motion sickness for a significant percentage of VR users.

Accordingly, there is a need for VR system, in which the users/players are able to access virtual environments beyond the physical use space, without using hand held motion controllers and therefore to be able to operate and interact with real physical objects with their hands as well as.

SUMMARY

In some embodiments, the disclosed invention is directed to systems and methods for virtual reality locomotion without using motion controllers.

In some embodiments, the disclosed invention is a method executed by a virtual reality (VR) system for controlling VR locomotion in a VR environment, the method including: storing several gesture datasets in a storage device including key points; storing speed groupings data records for each stored gesture; receiving movement data related to a user's movement in the VR environment, from tracking pucks; identifying key points of the user movement within a predetermined time window by analyzing the received movement data; detecting a matched gesture of the user movement by comparing the key points of the user movement and the stored key points; selecting a speed group data set for the matched gesture from the stored speed groupings data records to determine movement speed of the user within the VR application; and executing a command in the VR environment based on the verified matched gesture and movement speed of the user.

In some embodiments, the disclosed invention is a VR system for controlling VR locomotion in a VR environment. The system includes a storage device for storing several gesture datasets, each including key points, and for storing speed groupings data records for each stored gesture dataset; two or more tracking pucks for receiving movement data related to a user's movement in the VR environment; and one or more processors for identifying key points of the user movement within a predetermined time window by analyzing the received movement data, detecting a matched gesture of the user movement by comparing the key points of the user movement and the stored key points, selecting a speed group data set for the matched gesture from the stored speed groupings data records to determine movement speed of the user within the VR application, and executing a command in the VR environment based on the verified matched gesture and movement speed of the user.

In some embodiments, the disclosed invention is a VR system for controlling VR locomotion in a VR environment. The system includes means for storing a plurality of gesture datasets, each gesture datasets including a plurality of key points, and for storing a plurality of speed groupings data records for each stored gesture dataset; means for receiving movement data related to a user's movement in the VR environment; means for identifying a plurality of key points of the user movement within a predetermined time window by analyzing the received movement data; means for detecting a matched gesture of the user movement by comparing the key points of the user movement and the stored plurality of key points; means for selecting a speed group data set for the matched gesture from the stored plurality of speed groupings data records to determine movement speed of the user within the VR application; and means executing a command in the VR environment based on the verified matched gesture and movement speed of the user.

In some embodiments, the gesture datasets may be created by receiving movement data sets from movements of a plurality of users, group similar movement data sets into common statistical data sets, and utilize key points in the common statistical data sets to determine movement, speed and direction of the movements of the plurality of users. In some embodiments, the system determines whether the detected gesture is within a predetermined movement tolerance, before verifying the matched gesture and may filter noise from the received movement data.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

In some embodiments, the disclosed invention is directed to systems and methods for virtual reality locomotion without using motion controllers. This way, the hands of the user of a virtual reality (VR) system used for, for example, training or playing games, are free to perform other tasks.

Figure 1:
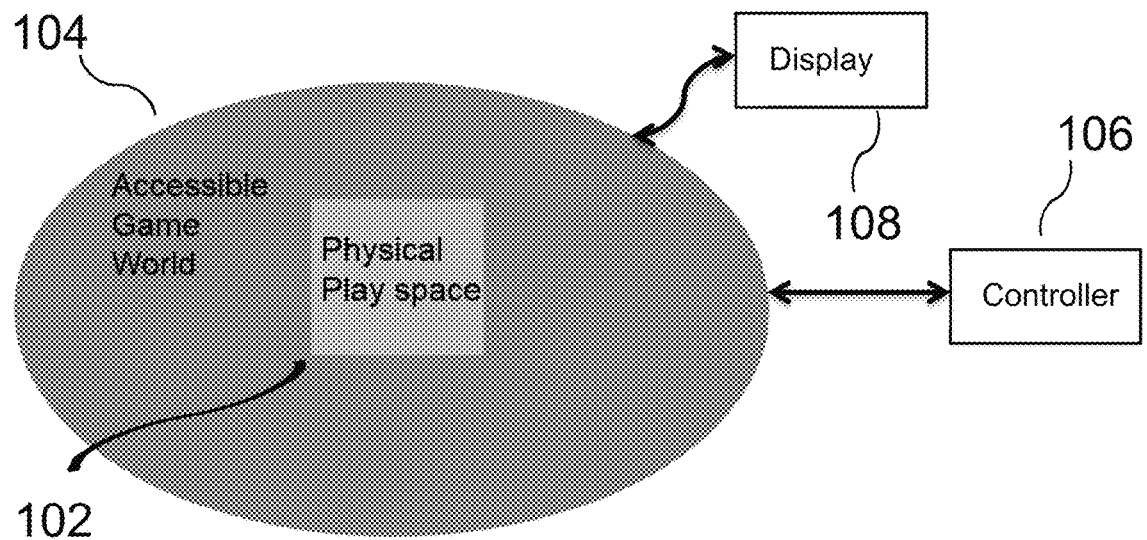
FIG. 1 is a simplified diagram of a typical environment for a virtual reality (VR) game.
Figure 2:
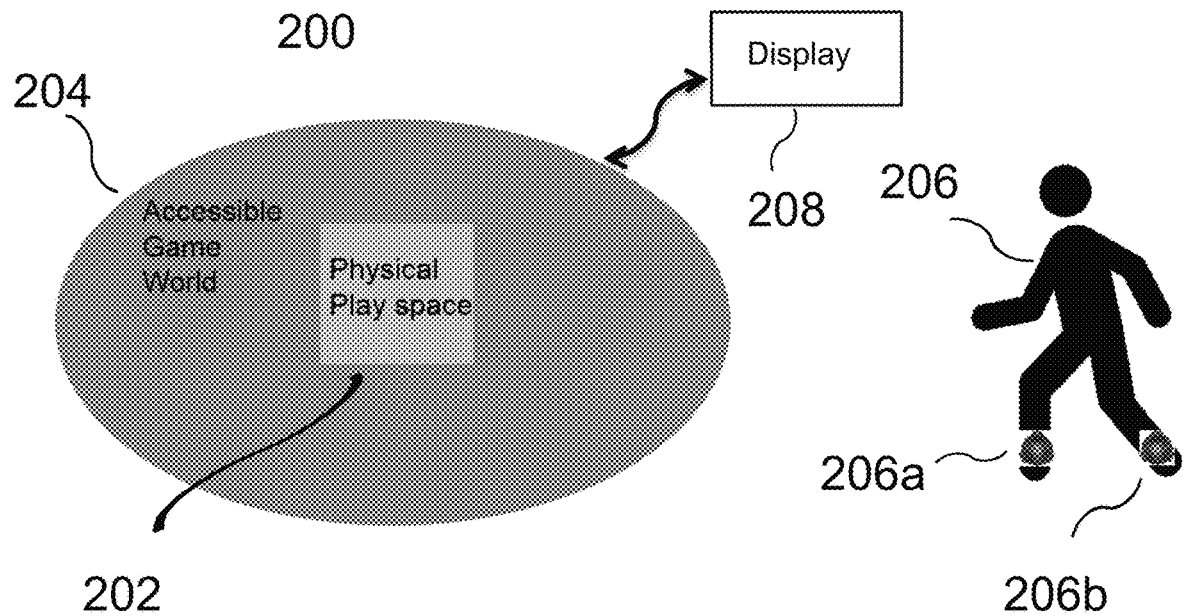
FIG. 2 is a simplified block diagram of an exemplary VR system, according to some embodiments of the disclosed invention.

FIG. 2 is a simplified block diagram of an exemplary VR system 200, according to some embodiments of the disclosed invention. As shown, the VR system 200 does not require any hand-held motion controllers for interaction with the user. Rather in some embodiments, VR system 200 uses 6 Degree of Freedom (6 DOF) motion trackers or tracking pucks 206a and 206b attached to each user/player ankles or feet. The user runs or walks in-place in a way that feels natural to the individual. The VR system then translates that motion into player movement in the game, which allows the player to access the full extent of the VR world. Similar to FIG. 1, a user or player 206 interacts with the VR environment, as an accessible use or play world 204 within a physical use/play space 202, using a display, headset or VR head mounted display (HMD) 208.

The VR user's natural head bob motion while running in place or walking in place in combination with the general run in-place motion translated within the game substantially reduces motion sickness commonly seen in sliding locomotion solutions. In some embodiments, the system uses a combination of the change in height and velocity of the trackers to thrust the player forward with each downward leg pump. The system keeps the users' hands free so that they can interact with and operate other physical devices, even while using the VR system. The system also enables players to retain their full range of motion. In some embodiments, the system automatically and quickly deciphers whether the user is walking within the physical use/play space or intending to run in-place into the rest of the accessible use/game world, by analyzing the user's movement data and detecting some pre-stored gestures (patterns), as described below. As one skilled in the art would readily recognize, the VR system includes one or more processors, associated memory (storage devices) and input/output devices (for example similar to the computer 316 in FIG. 3) to execute various VR programs and applications, including the processes described in FIGS. 4-6.

Figure 3:
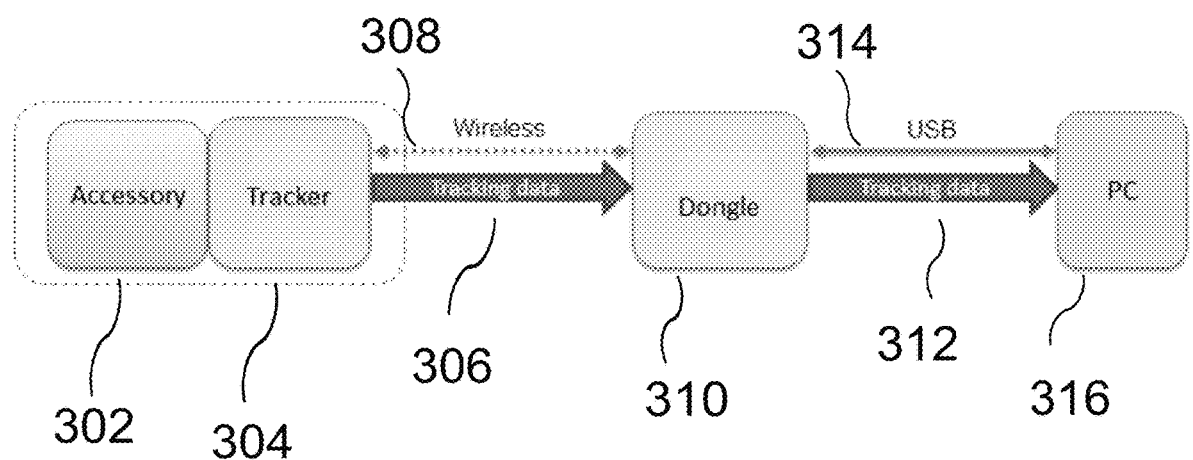
FIG. 3 is a simplified block diagram of a typical tracking puck configuration for a virtual reality (VR) game.

FIG. 3 is a simplified block diagram of a typical tracking puck configuration for a virtual reality (VR) game. As shown in FIG. 2, the tracking pucks 206a and 206b are typically attached to player's ankles or feet. In some embodiments, the tracking pucks 206a and 206b are commercially available devices that are being used in the present VR system with no major modification. The specific tracking pucks used is not important to the function of the VR system as long as they can output basic spatial data at a high frequency with minimal drift. As depicted, the tracking puck includes a tracker 304, which communicates tracking data 306 wirelessly 308 to its associated dongle 310. Dongle 310 may be a USB adapter that plugs into a computer 316, such as a PC and receives the X,Y,Z tracking data 312 from the tracker 304 and inputs it to the computer 316. The tracking puck can optionally be attached to an accessory 302. In this case, the puck is attacked to the VR user's ankle, foot or leg. In some embodiments, tracking pucks may be used in combination with motion controllers or in a tracker only configuration without motion controllers.

Figure 4:
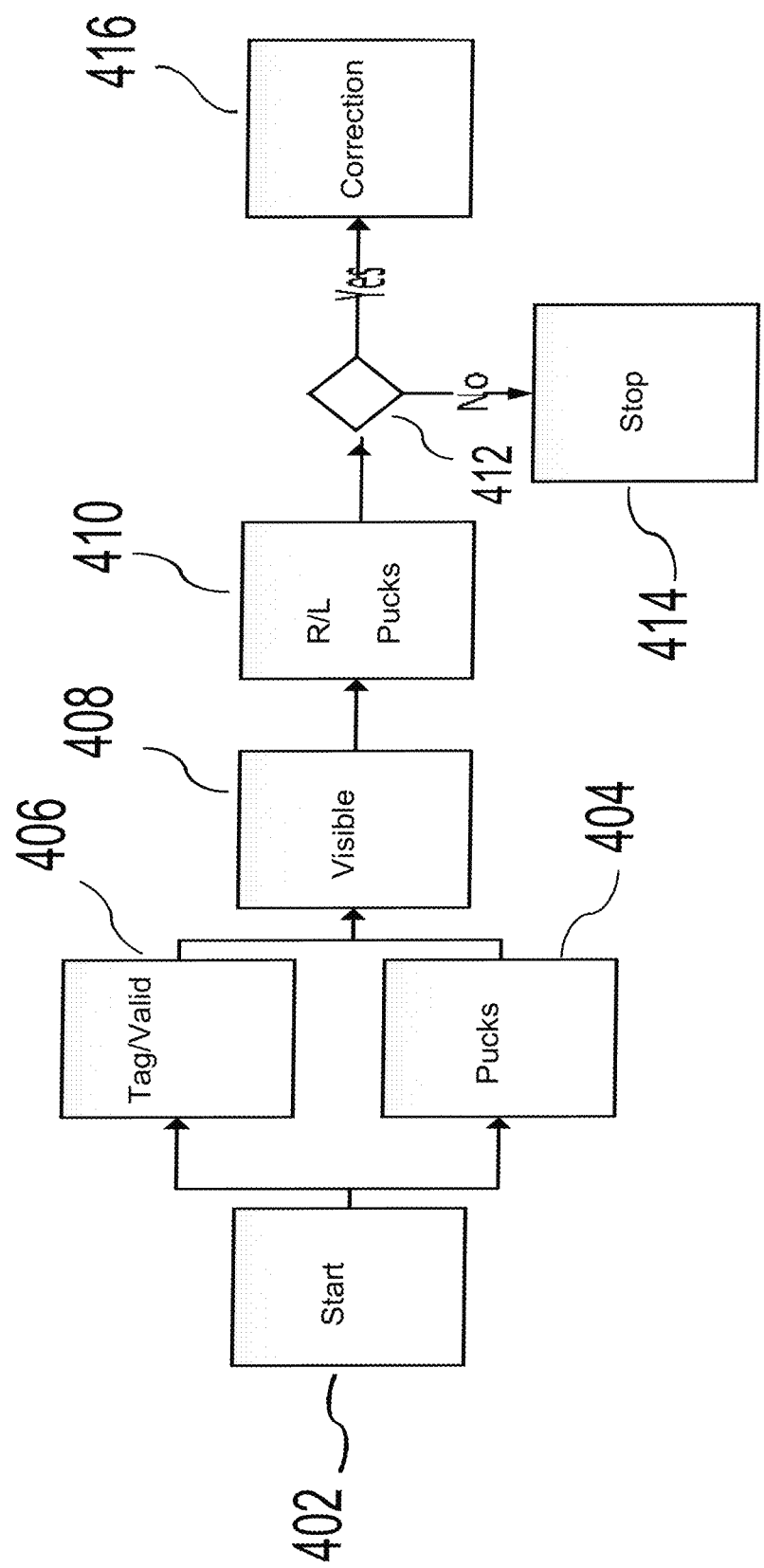
FIG. 4 is an exemplary process flow for calibration of run-in-place locomotion process, according to some embodiments of the disclosed invention.

FIG. 4 is an exemplary process flow for calibration of run-in-place locomotion process, according to some embodiments of the disclosed invention. Tracker calibration process typically occurs at the beginning of a use/play session with a new user. In block 402, the calibration process is initiated for the user. The calibration process is used by the VR system to determine which tracking pucks are on the ankles or on the feet of the user, in the case more than two tracking pucks are in use at one time. As shown in block 404, tracking pucks less than a predetermined adjustable distance (for example, 30 inches for a specific user) from the ground are assumed to be on the ankle or foot and are tagged as such. In some embodiments, tracking pucks more than the predetermined adjustable distance (for example, 30 inches) from the ground are assumed not to be on the ankle or foot and therefore are tagged as accessories (to be used as accessories), in block 406.

The calibration process also confirms that the configuration for each specific player is valid, in block 406. In some embodiments, a valid configuration is confirmed when all in use pucks are communicating with the application and are tagged appropriately for their respective roles (e.g., ankle, foot, leg or accessory), based on their location at the time of calibration. In some embodiments, once the system determines the detected pucks are valid and tagged for a role, the configured tracking pucks are made visible to the VR user (e.g., on a display) within the application (block 408) for some time or the entire remainder of the calibration process. This enables the user to visually confirm the tracking pucks configuration is valid before completing the calibration. In block 410, the first two valid tracking pucks are that are determined to be on the ankles or on the feet of the user are assumed to be attached to the left and right ankle or foot, respectively and are tagged as such. Pucks that determined to be attached to a user's feet or ankle are then tagged left and right based on their relative position and orientation to each other and to the foreword movement vector of the HMD as worn by the VR user.

In block 412, the system determines if there are any errors or mismatch in the trackers pucks or how they are configured. Typical invalid configurations are caused by tracking pucks that have not been previously powered on or are not positioned correctly on the user's body. If errors are present, as seen by the VR user or flagged by the system, the calibration process can be restarted after the issues are corrected, in block 416. If errors are not present, the process completes calibration, in block 414.

Figure 6:
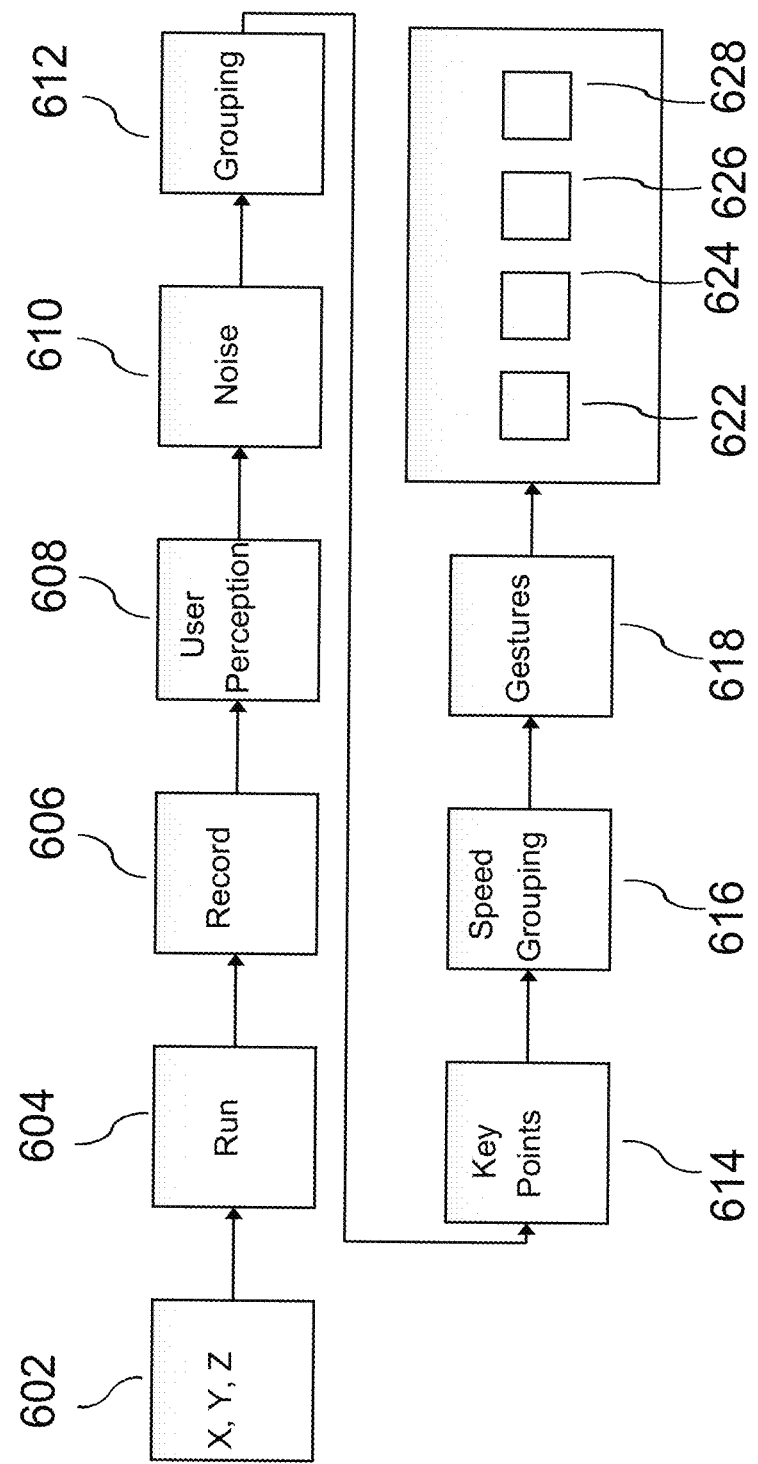
FIG. 6 is an exemplary process flow for creating various gestures, according to some embodiments of the disclosed invention.

FIG. 6 is an exemplary process flow for creating various gesture datasets, according to some embodiments of the disclosed invention. Typically, gesture creation occurs during system development, however, users are able to create their owned customized gestures for their personal running styles. For example, various gestures may be created for different individual run-in-place style movements of the users and once any of them is detected/matched, a specific movement speed and direction is applied and a commend is triggered in the VR environment. In some embodiments, the system takes input data from various users and groups similar data sets into common statistical data sets and then uses specific key points to determine characteristics such as movement, speed, direction, the like.

As shown in block 602, the X, Y, Z coordinates of the tracking pucks are received by the system. In some embodiments, in order to create gesture datasets, multiple VR users are asked to run in place (block 604) so that their movement data from the trackers is recorded (e.g., in a storage or memory device) in block 606. Also, each user's perception of how fast they should be moving within the VR application is recorded, in block 608. Users are asked to quantify how fast they believe that they should be moving in game per their current run-in-place movement and speed as it was recorded. This is a process for creating speed groupings as shown in block 616. This way, the user runs or walks in-place in a way that feels natural to him and the VR system then translates that motion into user's movement in the VR environment.

In block 610, data jitter and noise are optionally removed from the tracker data. Jitter and noise may be data outliers that otherwise don't belong in the received movement data set, for example, the data sets for stair steps between the high and low points of a given Z value. This step in the process smooths that data out into a straight line which removes any outliers typically caused by tracking puck data tolerance error.

The tracker data from all VR users is stored and sorted into groupings that show similar X, Y, Z data patterns, or key points, in block 612. In block 614, specific key points for each gesture are defined. A key point is a set of common data ranges and patterns consistent with a given gesture or run type. Key points are used to identify gestures in a given X,Y,Z data stream. Examples of some key points for various gestures are described in the following paragraph. In block 616, speed groupings, for example variations in movement speed of the user in the VR environment, are created and stored in a storage device so that slight variations in movement by the user doesn't cause any action.

In some embodiments, speed groupings are manually created from each group, based on data relative to a user's perception of how fast they should be moving in the application and their run-in-place speed, in combination with their actual recorded data set key point values and gesture type. For instance, users are asked their perception of how fast they should be moving within the VR application during the gesture recording process. Their input is recorded and correlated to the captured data. For example, during gesture creation process, User A is running in-place with a butt kick gesture. User A then reports that they feel that they should be moving at X speed in the VR application, then that X speed is generally matched with their current Z movement range and velocity. Once there is sufficient input from several users, a data pattern emerges as to what speeds should be matched with what gesture specific data sets for a user. This information is then used to create speed groupings that generalize the movement speeds within the VR application based on a user's gesture input.

In block 618, the collected data is used to define the various gestures, for example, high knees gesture 622, butt kick gesture 624, legs swinging to the sides gesture 626 and any other new gesture 628 are identified. For instance, the key points for the high knees gesture 622 has mostly vertical movements (e.g., in excess of 5 inches) along the Z-axis with very little forward and backward movement. In this case, the peak to peak of the Z-axis movement is measured at certain time intervals, for example, at approximately 0.5 seconds. However, the butt kick gesture 624 has a lot more horizontal and rotational movement combined (e.g., a range of 5-30+ inches) on the z axis. The legs swinging to the sides gesture 626 has very little vertical movement and lots of horizontal movement about the X/Y axis (e.g., in excess of 5 inches). The gesture key points are depending on individual VR user physical characteristics and may be determined for each individual user, in the calibration process described above.

Figure 5:
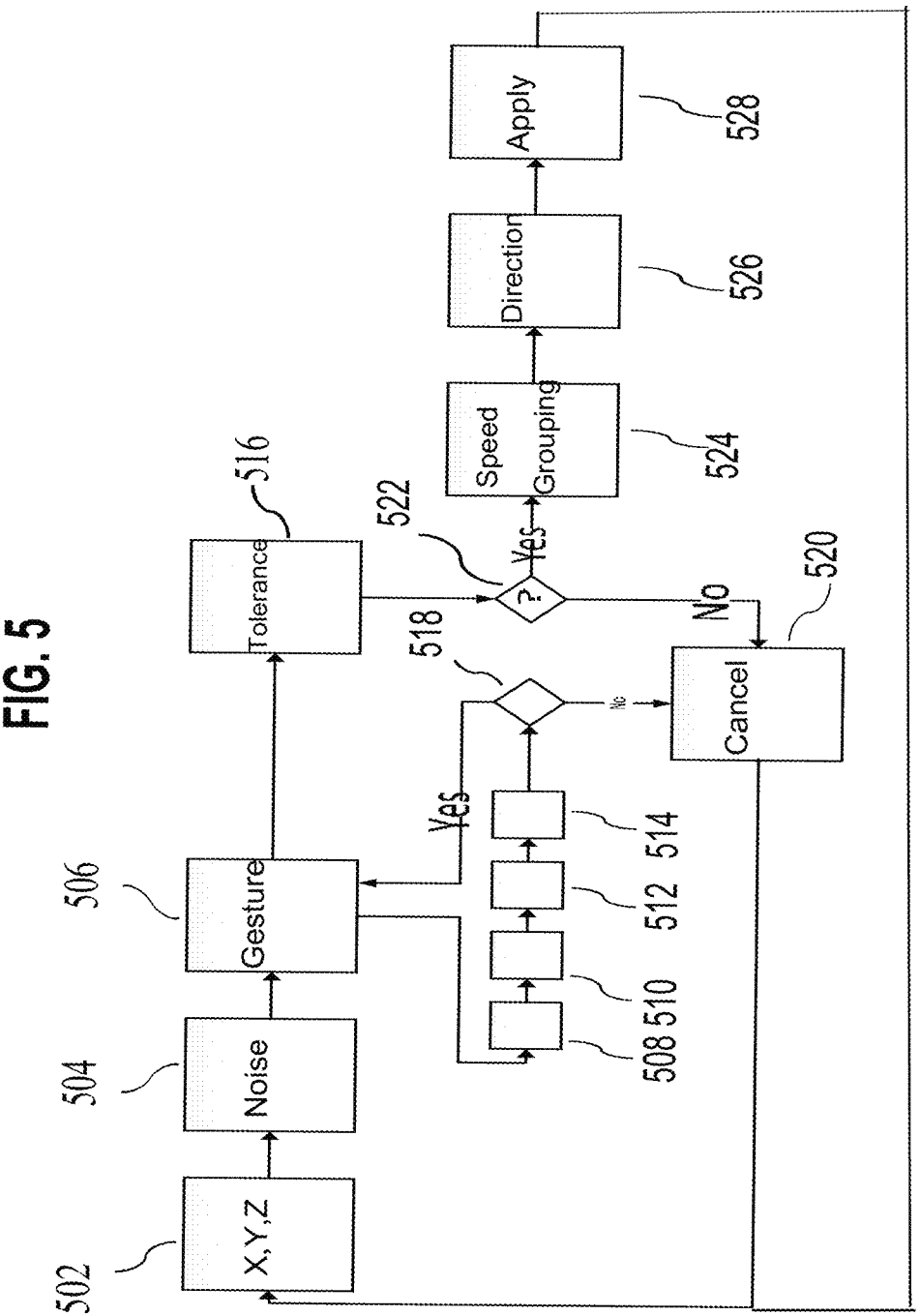
FIG. 5 is an exemplary process flow of the run-in-place locomotion process, according to some embodiments of the disclosed invention.

FIG. 5 is an exemplary process flow of the run-in-place locomotion process, according to some embodiments of the disclosed invention. As shown in block 502, the X, Y, Z coordinates of the tracking pucks are received by the system. In some embodiments, the process removes jitter and/or noise in the input data, as depicted by block 504. In block 506, the key points of a gesture are detected within a (short) time window based on the user movement data. In some embodiments, the process takes into account three major types of running-in-place and three (created and stored) gestures: a "high knees" gesture 508, a "legs swinging to the sides" gesture 510, a "butt kick" gesture 512, and any other relevant gesture 514 that has been created and stored by a gesture creation process, for example, the one described with respect to FIG. 4. Each gesture has its own pattern to be matched against those that are specific to that movement, known as key points.

In some embodiments, the positional (X,Y,Z) from the trackers are received at all times when the system is running and fully configured and then input to a process to determine whether the user is walking or running (in-place). In some embodiments, the run-in-place locomotion process is continuously executed (by a computer) against the data stream. In order to determine each player's run-in-place style in real time, the last few seconds of feet movements may be executed through each of the gesture patterns that are available to match against.

In block 518, the system determines whether there is any match between any of the stored gesture datasets 508, 510, 512 or 514 with the user's gesture at a (predetermined) time window of his movement, based on the input data from block 506 and key points, for instance, as defined in block 618 of FIG. 6. If there is no match (block 522), as shown in block 520, the process cancels the current gesture of the user and the process goes back to block 502 to keep receiving input data (X, Y, Z) from the user. If there is a match (block 522) with any of the stored gestures 508, 510, 512 or 514, the system detects that matched gesture and determines it as the user's gesture at that time. In some embodiments, once the process detects a matched gesture in block 518, it no longer compares movements to the other gestures and begins to look for gesture specific key points for that matched gesture so that it can translate the matched gesture into a specific movement of the user.

For example, when a VR user starts running in place, the process may initially compare his movements against all stored gestures 508, 510, 512 and 514. Once a gesture matches, such as High Knees 508, the system continues to assume that the user is using high knees on subsequent process loops and proceeds to process data as a High Knees gesture until the user completes their run in place actions. This allows a more immediate application of the gesture data into game movement by shortening the process to only the first detected gesture.

In optional block 516, the system determines whether the detected gesture is within a certain (predetermined) movement tolerance. For example, in some embodiments, false positives for gesture matching may occur when tracker movement appears to match one of the gesture data sets 508, 510, 512 or 514, which can apply player movements for a single process loop. For instance, a "karate kick," (i.e., a very high kick) in some cases, may fall within the defined tolerances for high knees for single pass causing the player to be moved forward as part of a gesture when this is not intended behavior. In these cases, the system can quickly correct the error, because the continued data pattern will no longer match any gesture on subsequent process loops. For example, a first process loop that detects key points which match a gesture applies movement based on that matched dataset on the same pass of the process loop. Subsequent passes then verify the detected key points against the previously matched gesture for validating the movement.

In some embodiments, the system optionally checks the tracking pucks location delta at the high and low data points for each to confirm that the legs are alternating. This process avoids most jumps that wrongly may register a gesture.

In block 524, the process selects an appropriate speed grouping for the matched gesture. Speed groupings are selected per each gesture in order to keep the user's movement in the VR environment consistent when the player may have an inconsistent stride length while running in place. For example, in high knees gesture, a VR user may raise his leg 5 inches in one stride and 7 inches in the next stride. As a result, the detected gesture may not be consistent in terms of the VR users movement speed and stride, but the process selects a consistent speed grouping that keeps the user moving in the VR environment at a consistent speed. This approach helps to avoid the user disorientation because the user moves at a consistent speed within the VR application even if her X,Y,Z tracker data shows inconsistent height and velocity movements within the gesture key points. If the user begins to raise his leg, for example, by 7 inches consistently, then the speed group is increased to a faster movement in VR environment because the user intends to move faster and expects to move faster in the VR environment because of a more consistent stream of height and velocity gesture data at the new value range of 7 inches.

In block 526, the system determines intended movement direction of the user, for example, whether the user is intending to move in a forward direction or in a backward direction. In block 528, the system executes the movement direction based on the foreword movement vector of the users HMD. For example, the VR system may trigger a forward or backward teleport of the user in the VR environment. The movement direction is the direction in which to player is to be moved within the application, per the matching speed grouping while a recognized gesture is being performed. In some embodiments, the process is capable of gesture matching and applying the user's motion both in a forward direction and in a backward direction by making use of the orientation of the user's VR head mounted display, to allow the player to run backwards, for example, the process detects whether the foreword movement vector of the HMD is above 90 degrees with respect to the X/Y axis. If so, then the movement is applied in opposite direction of that the user is facing during the gesture. The system returns to monitoring tracking pucks X, Y, Z input in block 502.

In some embodiments, depending on the detected gesture of the user movement, the system may trigger various (movement) commands for the user in the VR environment, such as moving (or teleporting) forward or backward, moving slow or fast, turning, touching, grabbing, controlling an object, and the like, without the need or use of a game controller.

In some embodiments, most instances of false positives can be corrected by implementing Machine Learning as a means to define additional gestures and refine the existing data sets to be more accurate. In some embodiments, the process may be modified to handle the tracker input as a pair in order to consider their delta movements relative to each other when comparing against known gestures. For example, Machine Learning may be applied as part of creating gestures process. That is, for the multiple users wearing the tracking pucks and running in place for a while, the process learns that this is a running mode. The system, using Machine Learning, then eventually determines its own key points and gestures, over a period of time (training).

Similarly, for users jumping, karate kicking, walking around in the physical place space, the system learns that those are not running modes and will be able to determine the difference between what the users are doing and the existing modes (e.g., running mode) and build a more accurate database and interpretation of gesture data sets.

The improved VR system according to the disclosed invention may be used in entertainment applications such as gaming; in robotics to control robots in telepresence and tele-robotic systems; in social sciences and psychology to study and replicate interactions in a controlled environment; in training such as physical or medical (surgical) training, in rehabilitation; and to simulate real workspaces for workplace occupational safety and health purposes, educational purposes, and training purposes, where it provides users (learners) with a virtual environment where they can develop their skills without the real-world consequences of failing, such as in primary education, military, astronaut training, flight simulators, miner training, driver training and bridge inspection;

where it does not tie up the users' hands. Consequently, the improved VR system according to the disclosed invention improves various technologies related to each of the above applications.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims

The invention claimed is:

1. A method executed by a virtual reality (VR) system for controlling VR locomotion in a VR environment, the method comprising:

storing a plurality of gesture datasets in a storage device, each gesture dataset including a plurality of key points;

storing a plurality of speed groupings data records for each stored gesture;

receiving movement data related to a user's movement in the VR environment, from a plurality of tracking pucks;

identifying a plurality of key points of the user movement within a predetermined time window by analyzing the received movement data;

detecting a matched gesture of the user movement by comparing the key points of the user movement and the stored plurality of key points;

selecting a speed group data set for the matched gesture from the stored plurality of speed groupings data records to determine movement speed of the user within the VR application; and executing a command in the VR environment based on the verified matched gesture and movement speed of the user.

2. The method of claim 1, further comprising determining a direction of the user movement and executing the command partly based on the direction.

3. The method of claim 1, further comprising determining whether the detected gesture is within a predetermined movement tolerance, before verifying the matched gesture.

4. The method of claim 1, further comprising filtering noise from the received movement data.

5. The method of claim 1, further comprising creating the plurality of gesture datasets by receiving movement data sets from movements of a plurality of users; grouping similar movement data sets into common statistical data sets; and utilizing key points in the common statistical data sets to determine movement, speed and direction of the movements of the plurality of users.

6. The method of claim 1, further comprising performing a calibration process to determine which tracking pucks are on ankles or on feet of a particular user, to tag tracking pucks for their respective roles, and to confirm that a configuration of each of the plurality of tracking pucks for the particular user are valid.

7. The method of claim 6, wherein the calibration process further comprises tagging a particular tracking puck as an accessary when determining the particular tracking puck is not on the ankles or on the feet of the particular user.

8. The method of claim 6, wherein the calibration process further comprises displaying the tagged tracking pucks on a display when the tracking pucks are tagged and their configurations are confirmed.

9. The method of claim 6, wherein the calibration process further comprises tagging the first two of the tracking pucks that are determined to be on the ankles or on the feet of the particular user as left and right tracking pucks respectively, based on their relative position and orientation to each other and to a foreword movement vector of the user.

10. A virtual reality (VR) system for controlling VR locomotion in a VR environment comprising:

a storage device for storing a plurality of gesture datasets, each gesture datasets including a plurality of key points, and for storing a plurality of speed groupings data records for each stored gesture dataset;

a plurality of tracking pucks for receiving movement data related to a user's movement in the VR environment; and one or more processors for identifying a plurality of key points of the user movement within a predetermined time window by analyzing the received movement data, detecting a matched gesture of the user movement by comparing the key points of the user movement and the stored plurality of key points, selecting a speed group data set for the matched gesture from the stored plurality of speed groupings data records to determine movement speed of the user within the VR application, and executing a command in the VR environment based on the verified matched gesture and movement speed of the user.

11. The system of claim 10, wherein the one or more processors further determine a direction of the user movement and execute the command partly based on the direction.

12. The system of claim 10, wherein the one or more processors further determine whether the detected gesture is within a predetermined movement tolerance, before verifying the matched gesture.

13. The system of claim 10, wherein the one or more processors further create the plurality of gesture datasets by receiving movement data sets from movements of a plurality of users, group similar movement data sets into common statistical data sets, and utilize key points in the common statistical data sets to determine movement, speed and direction of the movements of the plurality of users.

14. The system of claim 10, wherein the one or more processors further execute a calibration process to determine which tracking pucks are on ankles or on feet of a particular user, to tag tracking pucks for their respective roles, and to confirm that a configuration of each of the plurality of tracking pucks for the particular user are valid.

15. The system of claim 14, wherein the calibration process executed by the one or more processors comprises tagging a particular tracking puck as an accessary when determining the particular tracking puck is not on the ankles or on the feet of the particular user.

16. The system of claim 15, wherein the calibration process executed by the one or more processors further comprises displaying the tagged tracking pucks on a display when the tracking pucks are tagged and their configurations are confirmed.

17. The system of claim 14, wherein the calibration process further comprises tagging the first two of the tracking pucks that are determined to be on the ankles or on the feet of the particular user as left and right tracking pucks respectively, based on their relative position and orientation to each other and to a foreword movement vector of the user.

* * * * *